(12) United States Patent
Dry

(10) Patent No.: US 6,482,249 B1
(45) Date of Patent: Nov. 19, 2002

(54) DIRECT SMELTING PROCESS

(75) Inventor: Rod Dry, City Beach (AU)

(73) Assignee: Technological Resources Pty. Ltd., Melbourne (AU)

(*) Notice: Subject to any disclaimer, the term of this patent is extended or adjusted under 35 U.S.C. 154(b) by 39 days.

(21) Appl. No.: 09/723,330

(22) Filed: Nov. 28, 2000

(30) Foreign Application Priority Data

Sep. 19, 2000 (AU) .............................................. PR 0231

(51) Int. Cl.[7] .................................................. C21B 13/00
(52) U.S. Cl. ...................................................... 75/502
(58) Field of Search ............................................ 75/502

(56) References Cited

U.S. PATENT DOCUMENTS 5,858,302 A * 1/1999 Gitman et al. .............. 266/226

FOREIGN PATENT DOCUMENTS

| WO | WO 96/31627 | 10/1996 |
|----|-------------|---------|
| WO | WO 00/01854 | 1/2000 |
| WO | WO 00/01855 | 1/2000 |

* cited by examiner

Primary Examiner—Melvyn Andrews
(74) Attorney, Agent, or Firm—Miles & Stockbridge P.C.; John C. Kerins

(57) ABSTRACT

A direct smelting process for producing iron and/or ferroalloys is provided, which involves forming a molten bath in a metallurgical vessel, supplying feed materials, injecting oxygen containing gas, generating upward movement of the molten material from the molten bath, wherein the oxygen-containing gas is injected by three or more lances, and entraining into the jets of oxygen containing gas a volume of top space gas that is 2–6 times the volume of the injected gas.

18 Claims, 1 Drawing Sheet

DIRECT SMELTING PROCESS

BACKGROUND OF THE INVENTION

1. Field of the Invention

The present invention relates to a process and an apparatus for producing iron and/or ferroalloys from ferruginous material, including iron ores, other ores containing iron such as chromite ores, partially reduced ores, and iron-containing waste streams such as steel reverts.

The present invention relates particularly to a molten metal bath-based direct smelting process and an apparatus for producing molten iron and/or ferroalloys.

2. Description of Related Art

One known molten bath-based direct smelting process for producing molten iron is the DIOS process. The DIOS process includes a pre-reduction stage and a smelt reduction stage. In the DIOS process ore (−8 mm) is pre-heated (750° C.) and pre-reduced (10 to 30%) in bubbling fluidised beds using offgas from a smelt reduction vessel which contains a molten bath of iron and slag, with the slag forming a deep layer on the iron. The fine (−0.3 mm) and coarse (−8 mm) components of the ore are separated in the pre-reduction stage of the process and the −0.3 mm component is collected in a cyclone and injected into the smelt reduction vessel with nitrogen whilst the coarse ore is charged by gravity. Pre-dried coal is charged directly to the smelt reduction vessel from the top of the vessel. The coal decomposes into char and volatile matter in the slag layer and the ore dissolves in the molten slag and forms FeO. The FeO is reduced at the slag/iron and slag/char interfaces to produce iron. The carbon monoxide generated at the iron/slag and slag/char interfaces generates a foaming slag. Oxygen is blown through a specially designed lance that introduces the oxygen inside the foamed slag and improves secondary combustion. Oxygen jets burn carbon monoxide that is generated with the smelting reduction reactions, thereby generating heat that is transferred first to the molten slag and then to the slag/iron interface by the strong stirring effect of bottom blowing gas. The stirring gas introduced into the hot iron bath from the bottom or side of the smelt reduction vessel improves heat transfer efficiency and increases the slag/iron interface for reduction and therefore the vessel productivity and thermal efficiency. However, injection rates must be limited as strong stirring lowers secondary combustion due to increased interaction between the oxygen jet and iron droplets in the slag with subsequent lowering of productivity and increased refractory wear. Slag and iron are tapped periodically.

Another known direct smelting process for producing molten iron is the Romelt process. The Romelt process is based on the use of a large volume, highly agitated slag bath as the medium for smelting ferruginous feed material to iron in a smelt reduction vessel and for post-combusting gaseous reaction products and transferring the heat as required to continue smelting ferruginous feed material. The ferruginous feed material, coal, and fluxes are gravity fed into the slag bath via an opening in the roof of the vessel. The Romelt process includes injecting a primary blast of oxygen-enriched air into the slag via a lower row of tuyeres to cause necessary slag agitation and injection of oxygen-enriched air or oxygen into the slag via an upper row of tuyeres to promote post-combustion. The molten iron produced in the slag moves downwardly and forms an iron layer and is discharged via a forehearth. In the Romelt process the iron layer is not an important reaction medium.

Another known direct smelting process for producing molten iron is the AISI process. The AISI process includes a pre-reduction stage and a smelt reduction stage. In the AISI process pre-heated and partially pre-reduced iron ore pellets, coal or coke breeze and fluxes are top charged into a pressurised smelt reactor which contains a molten bath of iron and slag. The coal devolatilises in the slag layer and the iron ore pellets dissolve in the slag and then are reduced by carbon (char) in the slag. The process conditions result in slag foaming. Carbon monoxide and hydrogen generated in the process are post combusted in or just above the slag layer to provide the energy required for the endothermic reduction reactions. Oxygen is top blown through a central, water cooled lance and nitrogen is injected through tuyeres at the bottom of the reactor to ensure sufficient stirring to facilitate heat transfer of the post combustion energy to the bath. The process offgas is de-dusted in a hot cyclone before being fed to a shaft type furnace for pre-heating and pre-reduction of the pellets to FeO or wustite.

Another known direct smelting process, which relies on a molten iron layer as a reaction medium, and is generally referred to as the HIsmelt process, is described in International application PCT/AU96/00197 (WO 96/31627) in the name of the applicant.

The HIsmelt process as described in the International application includes:

(a) forming a bath of molten iron and slag in a vessel;
(b) injecting into the bath:
  (i) ferruginous feed material, typically iron oxides; and
  (ii) a solid carbonaceous material, typically coal, which acts as a reductant of the iron oxides and a source of energy; and
(c) smelting the metalliferous feed material to metal in the iron layer.

The HIsmelt process also includes injecting oxygen-containing gas into a space above the bath and post-combusting reaction gases, such as CO and $H_2$, released from the bath and transferring the heat generated to the bath to contribute to the thermal energy required to smelt the metalliferous feed materials.

The HIsmelt process also includes forming a transition zone in the space above the nominal quiescent surface of the bath in which there is a favourable mass of ascending and thereafter descending droplets or splashes or streams of molten material that provide an effective medium to transfer to the bath the thermal energy generated by post-combusting reaction gases above the bath.

The applicant has carried out extensive research and development work on direct smelting processes including research and development work on the requirements for commercially operating processes and has made a series of significant findings in relation to such processes.

The focus of the present invention is on post combustion of reaction gases.

Without adequate post combustion of reaction gases and subsequent transfer of heat back to the molten bath, such molten bath based direct smelting processes, particularly those without a pre-reduction stage, become uneconomic and in many cases unworkable because of the endothermic nature of the reduction of ferruginous materials.

A further issue is that good post combustion must not be at the expense of re-oxidising significant amounts of molten metal in the molten bath as the process becomes inefficient, with excessive amounts of solid carbonaceous material being needed to counter such oxidation.

As well, excessively high amounts of liquid FeO in the molten bath are particularly detrimental to refractory wear around the region of the nominal quiescent level of the molten metal.

SUMMARY OF THE INVENTION

In general terms, the present invention is a direct smelting process for producing iron and/or ferroalloys which operates on a commercial scale in a metallurgical vessel that has a hearth, side walls, and a roof, and a minimum width dimension of the interior of the hearth of at least 4 meters, more preferably at least 6 meters.

In more specific terms, the direct smelting process includes the steps of:

(a) forming a molten bath containing molten metal and molten slag;

(b) supplying feed materials being ferruginous material, carbonaceous material, and fluxes into the vessel;

(c) smelting ferruginous feed material to molten metal in the molten bath and generating gases in the bath;

(d) injecting oxygen-containing gas being air or air with up to 50% oxygen into a space above the quiescent surface of the molten bath (the "top space") and combusting gases generated in the process; and (e) generating upward movement of molten material from the molten bath into the top space to facilitate heat transfer to the bath and to minimise heat loss from the vessel;

and which process is characterised by injecting the oxygen-containing gas through 3 or more lances and controlling the process by entraining a volume of top space gas into the jets of oxygen-containing gas injected into the vessel that is 2–6 times the volume of the injected gas.

The present invention is based on the realisation that entraining a volume of top space gas into the injected gas jets that is 2–6 times the volume of the injected gas makes it possible to achieve good post combustion of top space gas and good heat transfer to the molten bath and without unacceptable levels of re-oxidation of molten metal.

The present invention is also based on the realisation that it is possible to achieve entrainment of volumes of top space gas into the injected oxygen-containing gas within the range described above by injecting the oxygen-containing gas through lances having outlet ends of internal diameter of 0.6 m or less at a velocity of at least 150 m/s.

Accordingly, preferably the process is characterised by injecting jets of oxygen-containing gas through lances having outlet ends of internal diameter of 0.6 m or less at a velocity of at least 150 m/s.

Preferably the velocity is at least 200 m/s.

Preferably the process includes preheating the oxygen-containing gas to a temperature of 800–1400° C.

The use of 3 or more lances for injecting jets of oxygen containing gas allows the roof of the smelting vessel to be lower than otherwise would be the case with a single lance having the same total internal cross-sectional area as the multiple lances. This is due to the increase in surface-to-volume ratio of the gas jets emanating from the ends of the smaller multiple lances. Less free space for gas entrainment is needed, hence less vertical height in the metallurgical vessel. The result is a more compact, cost effective direct smelting process with lower heat losses from the vessel.

Preferably the process includes injecting oxygen-containing gas into the vessel in a swirling motion.

Swirl increases the suction rate of top space gas into the injected gas jets. Therefore, the use of swirl makes it possible for the height of the outlet ends of the oxygen-containing gas injection lances above the molten bath to be less than the height of non-swirl lances. Thus, a vessel that has a given number of swirl lances of a given internal diameter can be a lower height than a vessel that has the same number of non-swirl lances of the same internal diameter. This is an important consideration in terms of further minimising vessel height and thus surface area through which heat can be lost from the vessel.

Further, for a vessel of any given height, the use of swirl means that the number of lances for injecting jets of oxygen containing gas can be less than the number of non-swirl lances. However there is a limitation on the extent to which it is desirable to reduce the number of swirl lances. Specifically, as the number of lances is reduced in a vessel of a given size, the internal diameter of the lances must be increased significantly. With increasing internal diameter it becomes more difficult to cool the swirl apparatus within such lances, with the result that they have an increased tendency to burn away, particularly when using oxygen enriched preheated air. It is expected that lances of greater than about 0.6 metres internal diameter are unlikely to be able to support such swirl apparatus for the operating life needed i.e a minimum of 6 months and more desirably 12 months. The use of high heat conducting materials such as copper for the swirl apparatus is thought to be not viable given the tendency of pre-heated air to be carrying small abrasive particles with it, which quickly erodes soft material like copper.

Preferably when using swirl apparatus the number of lances used is from 3 to 6, whereas without swirl apparatus the number of lances is preferably 6 or more.

Preferably step (b) includes supplying feed materials by injecting feed materials into the molten bath through 3 or more downwardly extending solids injection lances and thereby generating a gas flow which causes:

(i) the formation of an expanded molten bath zone; and (ii) splashes, droplets and streams of molten material to be projected upwardly from the expanded molten bath zone.

The injection of feed materials and the resultant gas flow arising from the injection of the feed materials and reactions of the feed materials in the molten bath causes substantial movement of material into and from the expanded molten bath zone.

Preferably the process includes periodically or continuously tapping molten slag from the vessel.

Preferably the process also includes periodically or continuously tapping molten iron and/or ferroalloys from the vessel.

The ferruginous materials may include iron ores, other ores containing iron such as chromite ores, partially reduced ores, and iron-containing waste streams such as steel reverts. It is noted that whilst ferrous material, ie material in which iron is the principal component, is the preferred ferruginous material, the invention is not limited to the use of ferrous material.

Preferably the process includes injecting at least 80% by weight of the total weight of solid material required to operate the process through the solids injection lances.

Preferably the process includes injecting feed materials into the molten bath at a velocity of at least 40 m/s through the solids injection lances.

Preferably the velocity is in the range of 80–100 m/s.

Preferably the process includes injecting feed materials into the molten bath through the solids injection lances at a mass flow rate of up to 2.0 $t/m^2/s$ where $m^2$ relates to the cross-sectional area of the lance delivery tube.

Preferably the process includes injecting feed materials into the molten bath through the solids injection lances at a solids/gas ratio of 10–18 $kg/Nm^3$.

In the context of the present invention the term "smelting" is understood herein to mean thermal processing wherein chemical reactions that reduce the feed materials take place to produce liquid iron and/or ferroalloys.

In the context of the present invention the term "lance" is understood herein to be a gas/material injection device that protrudes to some extent into the interior of the vessel.

Preferably the gas flow generated in the molten bath is at least 0.35 $Nm^3/s/m^2$ (where $m^2$ relates to the area of a horizontal cross section through the hearth at its minimum width).

Preferably the gas flow generated in the molten bath is at least 0.5 $Nm^3/s/m^2$.

Preferably the gas flow rate generated in the molten bath is less than 2 $Nm^3/s/m^2$.

The gas flow generated in the molten bath may be generated in part as a result of bottom and/or side wall injection of a gas into the molten bath.

The molten material may form a "wet" layer or a "dry" layer on the side walls. A "wet" layer comprises a frozen layer that adheres to the side walls, a semi-solid (mush) layer, and an outer liquid film. A "dry" layer is one in which substantially all of the slag is frozen.

The production of slag in the vessel may be controlled by varying the feed rates of ferruginous material, carbonaceous material, and fluxes to the vessel and operating parameters such as oxygen-containing gas injection rates.

In situations where the process is concerned with producing iron, preferably the process includes controlling the level of dissolved carbon in molten iron to be at least 3 wt % and maintaining the slag in a strongly reducing condition leading to iron oxide levels of less than 6 wt %, more preferably less than 5 wt % (measured as the amount of iron in iron oxides in the slag tapped from the vessel).

The injection of ferrous material and carbonaceous material may be through the same or separate lances.

Preferably the level of post-combustion is at least 40%, where post-combustion is defined as:

$$\frac{[CO_2] + [H_2O]}{[CO_2] + [H_2O] + [CO] + [H_2]}$$

where:

[$CO_2$]=volume % of $CO_2$ in off-gas

[$H_2O$]32 volume % of $H_2O$ in off-gas

[CO]=volume % of CO in off-gas

[$H_2$]=volume % of $H_2$ in off-gas

In general terms the present invention also provides an apparatus which produces iron and/or ferroalloys by a direct smelting process, which apparatus includes a fixed non-tiltable metallurgical vessel that has a hearth, side walls, and a roof, and a minimum width dimension of at least 4 meters, preferably at least 6 meters, in the interior of the hearth and contains a molten bath of iron and slag that includes a metal-rich zone and an expanded molten bath zone above the metal-rich zone.

In more specific terms:

(a) the hearth is formed of refractory material and has a base and sides in contact with the molten metal;

(b) the side walls extend upwardly from the sides of the hearth and are in contact with the expanded molten bath zone, wherein the side walls that contact the expanded molten bath zone include water cooled panels and a layer of molten material on the panels;

(c) 3 or more lances extending downwardly into the vessel and injecting jets of oxygen-containing gas being air or air enriched with up to 50% oxygen into a region of the vessel above the molten bath;

(d) a means for supplying feed materials being ferruginous material and/or carbonaceous material and carrier gas into the molten bath; and (e) a means for tapping molten metal and slag from the vessel.

In more specific terms each oxygen-containing gas injection lance has an outlet end of internal diameter of 0.6 m or less, protrudes at least a distance equivalent to its internal diameter into the vessel, and the oxygen-containing gas is injected therethrough at a velocity of at least 150 m/s.

Preferably the velocity is at least 200 m/s.

Preferably the oxygen-containing gas injection region is a central region of the vessel.

Preferably the outlet ends of the oxygen-containing gas injection lances are no more than 7 m above a quiescent surface of the molten bath.

It is highly desirable that the placement of the lances and the length of protrusion into the vessel be selected so as to prevent the flame caused by post-combustion from tracking along the side walls or roof of the vessel.

Preferably step (d) includes injecting the feed materials through at least 3 solids injection lances into the molten bath.

Preferably the numbers of the solids injection and oxygen-containing gas injection lances and the relative positions of these lances and the operating conditions of the process are selected so that:

(i) the expanded molten bath zone includes a raised region around the oxygen-containing gas injection region of the vessel between the region and the side walls;

(ii) splashes, droplets and streams of molten material project upwardly from the raised region and form a curtain around the oxygen gas injection region between the region and the side walls and wet the side walls; and (iii) a "free" space forms around a lower end of each oxygen-containing gas injection lance, the free space having a concentration of molten material that is lower than the molten material concentration in the expanded molten bath zone.

Preferably the solids injection lances extend through water cooled panels in the side walls of the vessel and downwardly and inwardly to the hearth region of the vessel.

BRIEF DESCRIPTION OF THE DRAWING

The present invention is described further by way of example with reference to the accompanying drawing which is a vertical section illustrating in schematic form a preferred embodiment of the process and the apparatus of the present invention.

DETAILED DESCRIPTION OF THE PREFERRED EMBODIMENTS

Figure 1:
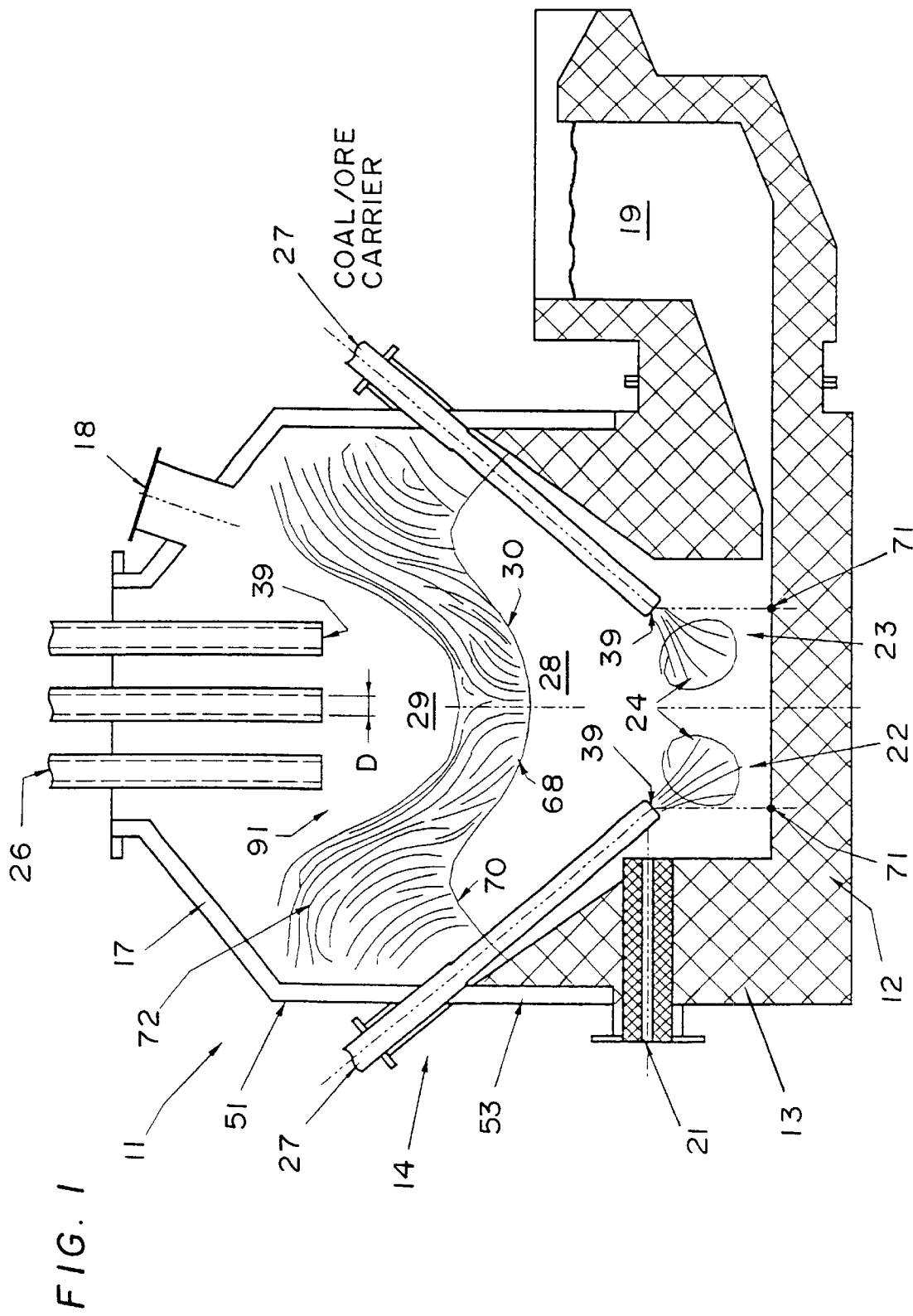

The following description is in the context of smelting iron ore to produce molten iron and it is understood that the present invention is not limited to this application and is applicable to a smelting any suitable feed materials.

The direct smelting apparatus shown in the figure includes a metallurgical vessel denoted generally as 11. The vessel 11 has a hearth that includes a base 12 and sides 13 formed from refractory bricks; side walls 14 which form a generally cylindrical barrel extending upwardly from the sides 13 of the hearth and which includes an upper barrel section 51 formed from water cooled panels and a lower barrel section 53 formed from water cooled panels having an inner lining of refractory bricks; a roof 17; an outlet 18 for off-gases; a forehearth 19 for discharging molten iron continuously; and a tap-hole 21 for discharging molten slag.

The hearth and the upper barrel section 51 define cylindrical regions within the vessel. The lower barrel section 53 defines a generally frusto-conical cylindrical region within the vessel which provides a transition between the narrower diameter hearth and the wider diameter upper barrel section 51. In a commercial scale plant, ie a plant producing at least 500,000 tonnes/year of molten iron, the diameter of the hearth is at least 4 meters, more preferably at least 6 meters.

It is noted that the present invention is not limited to this vessel geometry and extends to any other suitably shaped and sized vessel for producing molten metal on a commercial scale.

In use, the vessel contains a molten bath of iron and slag.

The vessel is fitted with 3 downwardly extending hot air injection lances 26 for delivering jets of hot air into a central, upper region 91 of the vessel and post-combusting reaction gases released from the molten bath. The outlet ends 39 of the lances 26 have an internal diameter D of 0.6 m or less. The outlet ends 39 are positioned at least 7 metre above a quiescent surface (not shown) of the molten bath in a commercial scale plant.

The term "quiescent surface" is understood to mean the surface of the molten bath when there is no injection of gas and solids into the vessel.

The vessel is also fitted with 6 solids injection lances 27 (only two of which are shown in the figure) extending downwardly and inwardly through the side walls 14 and into the molten bath at an angle of 20–700 to the horizontal for injecting feed materials being iron ore, solid carbonaceous material, and fluxes entrained in an oxygen-deficient carrier gas into the molten bath.

The lances 27 are positioned so that the outlet ends 39 of the lances 27 are equi-spaced apart around the central axis of the vessel. In addition, the lances 27 are positioned so that lines drawn vertically down from the outlet ends 39 intersect the base 12 of the hearth at locations 71 on a circle that has a diameter of the order of $\frac{2}{3}$ of the diameter of the hearth.

It is noted that the position on the lances 27 is selected in the context of the position of the oxygen lances 26 and the objective of forming a curtain 72 of molten material at least substantially around the lances 26 and between the side walls 14 of the vessel and the lances 26 and that a different arrangement of lances 27 may be more appropriate to achieve this objective in a different vessel/lance 26 configuration. Specifically, it is noted that the present invention is not limited to arrangements in which the lances 26 are centrally located.

In use, iron ore, solid carbonaceous material (typically coal), and fluxes (typically lime and magnesia) entrained in a carrier gas (typically $N_2$) are injected into the molten bath via the lances 27 at a velocity of at least 40 m/s, preferably 80–100 m/s. The momentum of the solid material/carrier gas carries the solid material and gas towards the base 12 of the hearth into regions (the circled regions indicated by the numeral 24) that are spaced around the central axis of the vessel. These regions are referred to in the following description as regions 24 of high concentration of solids/gas injection. The coal is devolatilised and thereby produces gas. Carbon partially dissolves into the metal and partially remains as solid carbon. The iron ore is smelted to metal and the smelting reaction generates carbon monoxide gas. The gases transported into the molten bath and generated via devolatilisation and smelting produce significant buoyancy uplift of molten material (including metal and slag) and solid carbon from the molten bath.

The buoyancy uplift of molten material and solid carbon causes substantial agitation in the molten bath, particularly immediately above and outwardly spaced from the regions 24 of high concentration of solids/gas injection, with the result that an expanded molten bath zone 28 that has a surface indicated by the arrow 30 forms. More particularly, the surface of the expanded molten bath zone 28 forms an annular raised region 70 between the central region 91 and the vessel side walls 14. The extent of agitation is such that there is substantial movement of molten material within the expanded molten bath zone 28 and strong mixing of the molten material within this zone to the extent that there is reasonably uniform temperature—typically, 1450–1550° C. with a temperature variation of the order of 30° throughout the zone.

Notwithstanding the strong mixing of molten material in the expanded molten bath zone 28, molten iron progressively settles towards the lower part of the hearth and forms a metal-rich zone 23 and is continuously removed via the forehearth 19.

The interface between the expanded molten bath zone 28 and the metal-rich zone 23 is determined largely by the regions 24 of high concentration of solids/gas injection. The substantial upward movement of molten material from these regions is compensated for by the continual supply of further feed materials via the lances 27 and the downward movement of already-molten material.

In addition, the upward gas flow from the regions 24 of high concentration of solids/gas injection projects some molten material (predominantly slag) as splashes, droplets and streams beyond the raised region 70 of the expanded molten bath zone 28 and forms the above-described curtain 72. The molten material in the curtain 72 contacts the upper barrel section 51 of the side walls 14 that is above the expanded molten bath zone 28 and the roof 17.

In general terms, the expanded molten bath zone 28 is a liquid continuous volume, with gas voids therein.

The above-described movement of molten material can be visualised as a series of fountains originating from the regions of high concentration of solids/gas injection which forms the raised region 70 of the expanded molten bath zone 28 and the curtain 72 of molten material.

In addition to the above, in use, hot air at a temperature of 800–1400° C. is injected at a velocity of at least 150 m/s into the central region 91 of the vessel via lances 26. The hot air jets deflect upwardly projected molten material in that region and causes an essentially metal/slag free space 29 to form around the end of the lance 26. The downward jets of hot air contribute to shaping projected molten material into the above-described curtain 72.

The hot air injected via the lances 26 post-combusts reaction gases CO and $H_2$ in the free space 29 around the outlet ends 39 of the lances 26 and in the surrounding molten material and generates high temperatures of the order of 2000° C. or higher. The heat is transferred to the molten material in the region of gas injection and the heat is then partially transferred via the molten material to the metal-rich zone 23.

The free space 29 is important to achieving high levels of post combustion because it enables gas in the space above the expanded molten bath zone 28 to flow into the free space 29 around the outlet ends 39 of the lances 26 and this gas flow increases exposure of available reaction gases to post combustion.

The above-described apparatus and process operating conditions make it possible to achieve entrainment of a volume of top space gas into the injected hot air that is 2–6 times the volume of the hot air. The applicant has found that this range of entrainment ratios makes it possible to achieve good post-combustion and heat transfer to the molten bath without unacceptable levels of re-oxidation of molten metal.

The curtain 72 is also important in providing a partial barrier to radiation energy from the post combustion jet to the side walls 14.

Moreover, the ascending and descending droplets, splashes and streams of molten material within the curtain 72 are an effective means of transferring heat generated by post combustion to the molten bath.

It is to be understood that this invention is in no way limited to the details of the illustrated construction and that many modifications and variations will fall within the spirit and scope of the invention.

What is claimed is:

1. A direct smelting process for producing iron and/or ferroalloys which operates on a commercial scale in a metallurgical vessel that has a hearth, side walls, and a roof, and a minimum width dimension of the interior of the hearth of at least 4 meters, which process includes the steps of:
   (a) forming a molten bath containing molten metal and molten slag;
   (b) supplying feed materials being ferruginous material, carbonaceous material, and fluxes into the vessel;
   (c) smelting ferruginous feed material to molten metal in the molten bath and generating gases in the bath;
   (d) injecting oxygen-containing gas being air or air with up to 50% oxygen into a top space above a level representative of a level of a quiescent surface of the molten bath, and combusting gases generated in the process; and
   (e) generating upward movement of molten material from the molten bath into the top space to facilitate heat transfer to the bath and to minimise heat loss from the vessel;
   and which process is characterised by injecting the oxygen-containing gas through 3 or more lances and controlling the process by entraining gas present in the top space of the vessel into the jets of oxygen-containing gas injected into the vessel in an amount that is 2–6 times the volume of the injected gas.

2. The process defined in claim 1 includes injecting the jets of oxygen-containing gas through lances having outlet ends of internal diameter of 0.6 m or less at a velocity of at least 150 m/s.

3. The process defined in claim 2 wherein the velocity is at least 20 m/s.

4. The process defined in claim 1 includes preheating the oxygen-containing gas to a temperature of 800–1400° C.

5. The process defined in claim 1 includes injecting oxygen-containing gas into the vessel in a swirling motion.

6. The process defined in claim 1 wherein step (b) includes supplying feed materials by injecting feed materials into the molten bath through 3 or more downwardly extending solids injection lances and thereby generating a gas flow which causes:
   (i) the formation of a n expanded molten bath zone; and
   (ii) splashes, droplets and streams of molten material to be projected upwardly from the expanded molten bath zone.

7. The process defined in claim 1 includes periodically tapping molten slag from the vessel.

8. The process defined in claim 1 includes continuously tapping molten slag from the vessel.

9. The process defined in claim 1 includes periodically tapping molten iron and/or ferroalloys from the vessel.

10. The process defined in claim 1 includes continuously tapping molten iron and/or ferroalloys from the vessel.

11. The process defined in claim 6 includes injecting at least 80% by weight of the total weight of solid material required to operate the process through the solids injection lances.

12. The process defined in claim 6 includes injecting feed materials into the molten bath at a velocity of at least 40 m/s through the solids injection lances.

13. The process defined in claim 12 wherein the velocity is in the range of 80–100 m/s.

14. The process defined in claim 6 includes injecting feed materials into the molten bath through the solids injection lances at a m ass flow rate of up to 2.0 t/m$^2$/s where m$^2$ relates to the cross-sectional area of the lance delivery tube.

15. The process defined in claim 6 includes injecting feed materials into the molten bath through the solids injection lances at a solids/gas ratio of 10–18 kg/Nm$^3$.

16. The process defined in claim 1 wherein the gas flow generated in the molten bath in step (c) is at least 0.35 Nm$^3$/s/m$^2$ (where m$^2$ relates to the area of a horizontal cross section through the hearth at its minimum width).

17. The process defined in claim 16 wherein the gas flow generated in the molten bath in step (c) is at least 0.5 Nm$^3$/s/m$^2$.

18. The process defined in claim 6 wherein the gas flow generated in the molten bath in step (c) is less than 2 Nm$^3$/s/m$^2$.

* * * * *

UNITED STATES PATENT AND TRADEMARK OFFICE
CERTIFICATE OF CORRECTION

PATENT NO.    : 6,482,249 B1
DATED         : November 19, 2002
INVENTOR(S)   : Rod Dry It is certified that error appears in the above-identified patent and that said Letters Patent is hereby corrected as shown below:

Column 9,
Line 51, replace "20" with -- 200 --

Column 10,
Line 10, replace "a n" with -- an --
Line 35, replace "m ass" with -- mass --

Signed and Sealed this

Fifteenth Day of April, 2003

JAMES E. ROGAN
*Director of the United States Patent and Trademark Office*